Aug. 21, 1923. Re. 15,678

W. J. MacARTHUR

DEVICE FOR DRAINING WATER FROM OIL TANKS

Original Filed April 24, 1922

INVENTOR:
WILLIAM J. MAC ARTHUR,
By Graham & Harris
ATTORNEYS.

Reissued Aug. 21, 1923. Re. 15,678

UNITED STATES PATENT OFFICE.

WILLIAM J. MACARTHUR, OF LOS ANGELES, CALIFORNIA, ASSIGNOR OF ONE-HALF TO REA E. MAYNARD.

DEVICE FOR DRAINING WATER FROM OIL TANKS.

Original No. 1,442,677, dated January 16, 1923, Serial No. 556,350, filed April 24, 1922. Application for reissue filed June 12, 1923. Serial No. 644,861.

*To all whom it may concern:*

Be it known that I, WILLIAM J. MACARTHUR, a subject of the King of England, residing at Los Angeles, in the county of Los Angeles, State of California, have invented a new and useful Device for Draining Water from Oil Tanks, of which the following is a specification.

My invention relates to the art of producing and transporting petroleum oil. In this art, the crude petroleum is commonly pumped or allowed to flow into large metal tanks in which it is gauged and from which it is pumped into a pipe line and transported to the refinery or point of rail shipment. In transporting it through pipe lines, it is necessary in the case of long lines to locate pumping stations at intervals at which other containers are placed in which the oil is temporarily stored. A great deal of the oil contains water and in the case of open tanks some water may enter the tanks during heavy rain storms. All of this water tends to settle in the bottom of the containers from which it is desirable to draw it from time to time so as to remove it from the oil before the same is used or refined.

For the purpose of drawing off this water, draw-off pipes are provided at or near the bottom of each of the tanks or containers and it is the duty of certain of the employees of the oil company to periodically draw off this water by opening the valve and allowing the water to run. Unless the employee remains at the valve ready to shut it off as soon as the water is withdrawn, there is a great liability of a portion of the oil escaping through this valve, which oil must be caught in an auxiliary settling tank and pumped back into the tank. There is also a liability that the employee will forget to draw off the water so that it is pumped into the line becoming emulsified with oil and producing trouble later in the use or refining of the oil.

It is an object of my invention to provide a device which may be attached to any tank or container and which will be so constructed that water will drain therethrough, and, at the same time, so constructed that there is no danger of any appreciable quantity of oil passing therethrough. I believe that my device depends for its action upon the difference in viscosity of the oil and water. I am not entirely sure of this theory and do not wish to be limited thereto, but have constructed and used such a device similar to that described herein over considerable periods and know that it operates as set forth hereinafter.

Referring to the drawing, which is for illustrative purposes only,

Figures 1, 2:
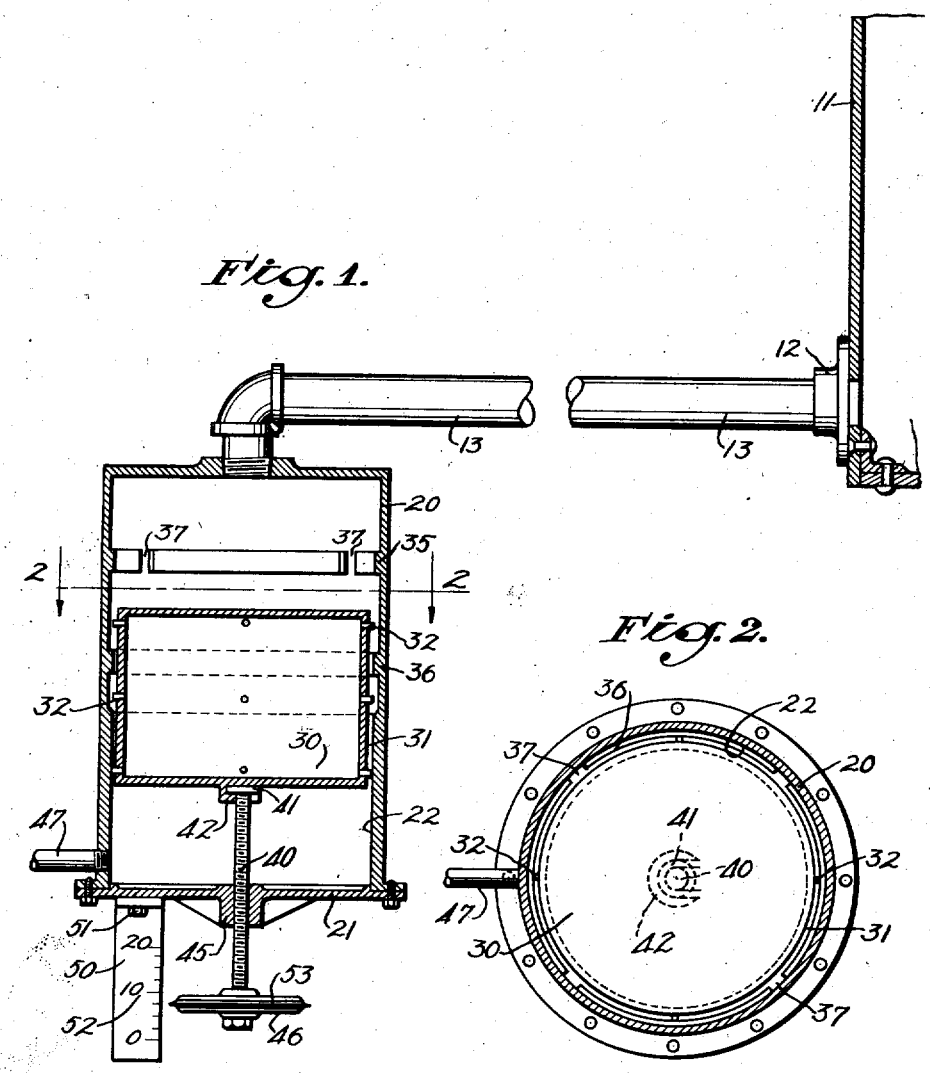
Fig. 1 is a diagrammatic view showing a section through one form of my invention.
Fig. 2 is a section on a plane represented by the line 2—2 of Fig. 1.

Referring to the drawing, 11 is a tank having a flange 12 near the bottom and into which a water draw off pipe 13 is connected. The other end of the pipe 13 is threaded in a casing 20 having a tight cover 21. The casing is provided with a bore 22 which is accurately turned or ground to form a cylindrical cavity of substantially uniform diameter. Sliding in this cavity is a plunger 30, this plunger being turned or ground on its outer surface 31 to form a cylinder of substantially uniform external diameter. Set in this plunger are a plurality of plugs or pins 32 which are turned or ground at their outer end to lie in a single cylindrical plane which is parallel to the outer plane 31 of the plunger 30 and substantially equal to the bore 22. The purpose of these pins is to hold the plunger 30 centrally at all times with a small but definite clearance between the outer surface 31 of the plunger and the inner surface 22 of the casing 20 and for the purpose of insuring this clearance at all times, rings 35 and 36, ground to the same diameter as the bore 22, are formed in the casing, these rings having longitudinal slots 37 formed therein so that the oil and water can pass readily therethrough. The plunger 30 may be adjusted up and down by means of an adjusting screw 40 having a head 41 fitting in a socket 42 in the plunger 30, the screw 40 being threaded in a boss 45 in the cover 21 and being operated by a hand wheel 46. Fluid is taken out from the space below the plunger 30 by means of an outlet pipe 47.

The method of operation is as follows:

Liquid, being admitted to the space inside the casing 20 and above the plunger 30 through the pipe 13, tends to pass through the narrow annular space between the plunger 30 and the inner bore 22 of the casing 20. This liquid is under some pressure due to the head of oil and water in the tank 11, and it is necessary to adjust the position of the plunger 30 vertically to suit the character of the oil in the tank and the conditions under the average temperature and pressure. It will be evident that the annular opening is of uniform area regardless of the position of the plunger 30 vertically, but that the length of this annular opening can be readily adjusted by moving the plunger 30 up or down in the casing 20. The thickness of the annular opening is made very small in some cases, being only one thousandth of an inch. Due, as I think, to the difference in viscosity between oil and water, I find that with the plunger 30 properly adjusted that it is possible to drain water at a slow rate through the pipe 13, the flow of liquid stopping whenever oil enters the interior of the casing 20, the heavier oil refusing to pass through the extremely small opening provided around the plunger 30. It is, however, necessary from time to time to move the plunger 30 to its extreme upper position and allow water or oil to pass therethrough for the purpose of flushing out any foreign matter which may collect therein.

While it is perfectly possible to operate my invention by trial, it is also possible to calibrate it; for this purpose, I use a plate 50 secured by a bolt 51 to the cover and having an arbitrary scale 52 thereon. The hand wheel 46 is provided with a raised rim 53 which indicates on the scale the position of the plunger 30. Any other convenient method of calibration may be used.

I claim as my invention:

1. In a device of the character described, the combination of: a casing; a plunger movable in said casing and so formed as to leave a small opening between said casing and said plunger; and means for so adjusting said plunger in said casing as to adjust the frictional resistance on a body of fluid flowing through said opening.

2. In a device of the character described, the combination of: a casing; a plunger movable in said casing and so formed as to leave a small opening between said casing and said plunger; and means for adjusting said plunger in said casing to regulate the length of said opening.

3. In a device of the character described, the combination of: a casing having a cylindrical bore therein; a plunger movable in said casing and so formed as to leave a small opening between said casing and said plunger; and means for so adjusting said plunger in said casing as to adjust the frictional resistance on a body of fluid flowing through said opening.

4. In a device of the character described, the combination of: a casing having a cylindrical bore therein; a plunger movable in said casing and so formed as to leave a small opening between its exterior and the inside of said cylindrical bore of said casing and said plunger; and means for so adjusting said plunger in said casing as to adjust the frictional resistance on a body of fluid flowing through said opening.

5. In a device of the character described, the combination of: a casing; a plunger movable in said casing and so formed as to leave a small annular opening between said casing and said plunger; and means for so adjusting said plunger in said casing as to adjust the frictional resistance on a body of fluid flowing through said opening.

6. In a device of the character described, the combination of: a casing; a plunger movable in said casing and so formed as to leave a small annular opening between said casing and said plunger; and means for adjusting said plunger in said casing to regulate the length of said opening.

7. In a device of the character described, the combination of: a casing having a cylindrical bore therein; a plunger movable in said casing and so formed as to leave a small annular opening between said casing and said plunger; and means for so adjusting said plunger in said casing as to adjust the frictional resistance on a body of fluid flowing through said opening.

8. In a device of the character described, the combination of: a casing having a cylindrical bore therein; a plunger movable in said casing and so formed as to leave a small annular opening between its exterior and the inside of said cylindrical bore of said casing and said plunger; and means for so adjusting said plunger in said casing as to adjust the frictional resistance on a body of fluid flowing through said opening.

9. In a device of the character described, the combination of: walls forming a chamber, said walls having an opening therein; and means for delivering oil and water into said chamber, said opening being of such size that, when once a water film has been established therein, oil will thereafter be excluded therefrom.

10. In a device of the character described, the combination of: walls forming a chamber, said walls having a narrow opening therein; means for delivering oil and water into said chamber, said opening being of such dimensions that when once a water film has been established therein, oil will thereafter be excluded therefrom; and means for varying the dimensions of said opening.

11. In a device of the character described, the combination of: walls forming a chamber, said walls having a narrow opening therein; means for delivering oil and water into said chamber, said opening being of such dimensions that when once a water film has been established therein, oil will thereafter be excluded therefrom; and means for varying the length of said opening.

In testimony whereof, I have hereunto set my hand at Los Angeles, California, this 15th day of May, 1923.

WILLIAM J. MACARTHUR.